D. S. EMRICK.
Horse Hay-Rake.
No. 102,238. Patented April 26, 1870.
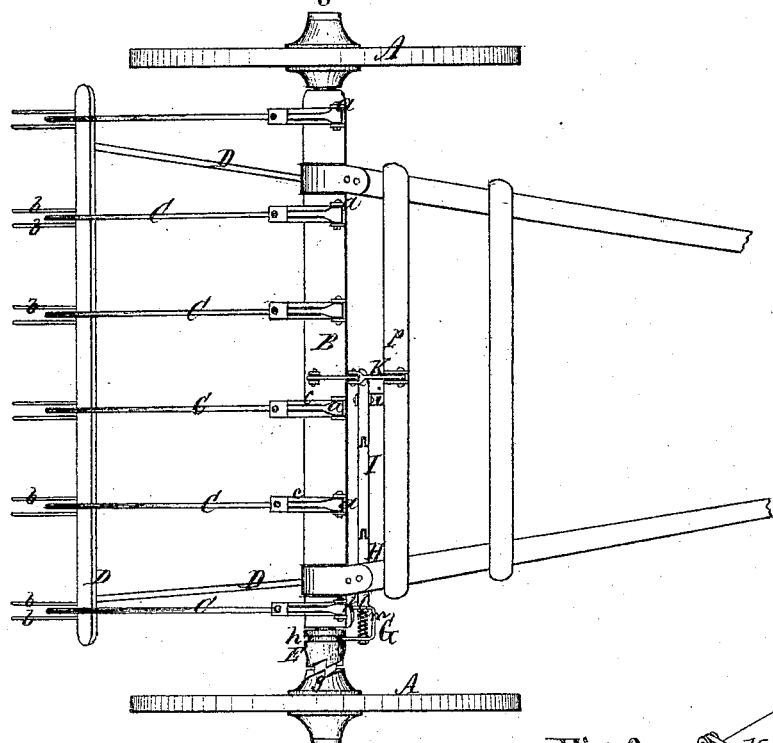
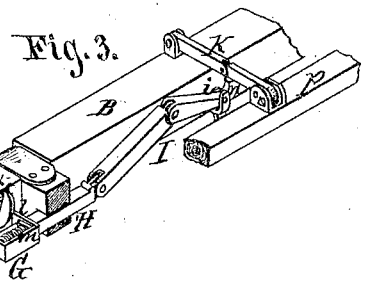
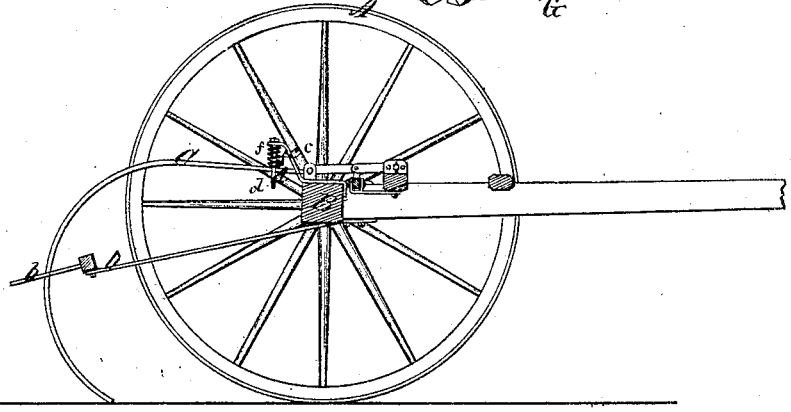
Witnesses. Inventor.

United States Patent Office.

DAVID S. EMRICK, OF FAYETTE, NEW YORK.

Letters Patent No. 102,238, dated April 26, 1870.

IMPROVEMENT IN HORSE HAY-RAKES.

The Schedule referred to in these Letters Patent and making part of the same.

To all whom it may concern:

Be it known that I, DAVID S. EMRICK, of Fayette, in the county of Seneca and State of New York, have invented a certain new and useful Improvement in Horse-Rakes, of which the following is a specification.

Nature of the Invention.

My improvement is of the kind mounted on wheels, in which the body of the axle receives a turning action to raise the teeth, by the engagement of the same with one of the wheels.

The invention consists, essentially, in the arrangement of parts connected with the wheels and axle for producing this action.

General Description.

In the drawings—

Figure 1 is a plan.

Figure 2, a vertical section.

Figure 3, a perspective view of a portion of the operating mechanism.

A A are the driving-wheels, and

B, the axle.

The wheels turn loosely on the skeins or journals, in the usual manner.

The rake-teeth C C C are hinged at $a$ $a$ to the axle, at suitable distances apart.

They are of the usual curved form, and pass through fingers, $b$ $b$, of a frame, D, fastened on the under side of the thills, so as not to be elevated when the teeth rise. The object of this arrangement is to sweep the hay off from the teeth as they rise through the fingers, which is done effectually.

Each tooth passes through a slotted guide, $c$, which keeps it in place as it rises and falls, and also through a depending staple, $d$, which prevents it from falling too low.

These parts are connected to form one device, and have a coiled spring, $f$, surrounding the staple and resting on top of the rake-tooth, as shown.

This connected device $c$ $d$ $f$ rises and falls with the tooth in the turning of the axle, and only serves to guide and retain the tooth, and give it a degree of elasticity, to spring up in passing any obstruction.

A clutch, E, is fitted on one end of the axle, to slide on a square portion of the same; and, when pressed out, its teeth engage with corresponding teeth of the hub $g$.

A shipper, G, holds in a groove, $h$, of the clutch, and is attached to a slide, H, which in turn is jointed to a toggle, I, whose fulcrum is at $i$. By pressing the foot on this toggle it will be seen that the clutch will be thrown in engagement with the hub of the wheel, and the revolution of the latter will turn the axle up, so as to elevate the teeth and discharge the hay.

When a proper elevation of the teeth for discharging the hay has been reached, a cam, $k$, on the axle strikes a projection, $l$, of arm or slide H, and draws the clutch back from engagement with the wheel, and allows the teeth to drop again.

To insure a free action of the parts, and to prevent strain upon the toggle, a spring, $m$, is located upon the slide H, within the bend of the shipper.

The inner end of the toggle has a projection, $n$, which rests under the joint of a second toggle, K, whose end attachments are on the axle and the cross-piece $p$ of the thills. This second toggle serves to keep the axle from turning or yielding accidentally, as it straightens when the teeth are turned down. The pressure of the foot upon the main toggle throws up the joint of the secondary one, and allows the action before described.

This arrangement for operating the axle I believe to be new.

I am aware that the axle of a horse-rake has before been made to turn up to elevate the teeth by engaging with the driving-wheel. Such, broadly, I do not claim.

What I claim as my invention, and desire to secure by Letters Patent, is—

1. The combination and arrangement of the toggles I K, the slide H, spring $m$, shipper G, and cam $k$, when employed in connection with the axle and clutch, substantially in the manner and for the purpose specified.

2. The toggle-levers I and K, constructed and arranged in such a manner that a projection, $n$, on lever I serves to operate toggle K, as and for the purpose set forth.

In witness whereof I have hereunto signed my name in the presence of two subscribing witnesses.

D. S. EMRICK.

Witnesses:
R. F. OSGOOD,
GEO. W. MIATT.